(12) United States Patent
Dong et al.

(10) Patent No.: US 9,282,337 B2
(45) Date of Patent: Mar. 8, 2016

(54) MEDIA SOURCE DEVICE WITH DIGITAL FORMAT CONVERSION AND METHODS FOR USE THEREWITH

(75) Inventors: SuiWu Dong, Markham (CA); Sally J. Daub, Toronto (CA)

(73) Assignee: VIXS SYSTEMS, INC., Toronto (CA)

( * ) Notice: Subject to any disclaimer, the term of this patent is extended or adjusted under 35 U.S.C. 154(b) by 191 days.

(21) Appl. No.: 12/394,425

(22) Filed: Feb. 27, 2009

(65) Prior Publication Data

US 2010/0223407 A1 Sep. 2, 2010

(51) Int. Cl.
| | | |
|---|---|---|
| G06F 13/38 | (2006.01) | |
| G06F 13/12 | (2006.01) | |
| H04N 19/40 | (2014.01) | |
| H04N 21/2343 | (2011.01) | |
| H04N 21/235 | (2011.01) | |
| H04N 21/24 | (2011.01) | |
| H04N 21/4402 | (2011.01) | |
| H04N 21/442 | (2011.01) | |
| H04N 21/643 | (2011.01) | |
| H04N 21/647 | (2011.01) | |
| H04N 21/654 | (2011.01) | |
| H04N 21/6587 | (2011.01) | |
| H04N 21/84 | (2011.01) | |

(52) U.S. Cl.
CPC ........... *H04N 19/40* (2014.11); *H04N 21/2343* (2013.01); *H04N 21/2358* (2013.01); *H04N 21/2402* (2013.01); *H04N 21/4402* (2013.01); *H04N 21/44227* (2013.01); *H04N 21/643* (2013.01); *H04N 21/64792* (2013.01); *H04N 21/654* (2013.01); *H04N 21/6587* (2013.01); *H04N 21/84* (2013.01)

(58) Field of Classification Search
None
See application file for complete search history.

(56) References Cited

U.S. PATENT DOCUMENTS

| | | | | |
|---|---|---|---|---|
| 7,836,193 | B2 * | 11/2010 | Ducharme | 709/231 |
| 8,028,094 | B2 * | 9/2011 | Sahdra et al. | 709/246 |
| 2002/0136298 | A1 * | 9/2002 | Anantharamu et al. | 375/240.12 |
| 2002/0178277 | A1 * | 11/2002 | Laksono | 709/231 |
| 2002/0178278 | A1 * | 11/2002 | Ducharme | 709/231 |
| 2004/0098748 | A1 * | 5/2004 | Bo et al. | 725/105 |
| 2004/0170159 | A1 * | 9/2004 | Kim et al. | 370/352 |
| 2005/0002453 | A1 * | 1/2005 | Chang et al. | 375/240.03 |
| 2005/0119976 | A1 * | 6/2005 | Taylor et al. | 705/52 |
| 2005/0138137 | A1 * | 6/2005 | Encarnacion et al. | 709/217 |
| 2005/0180341 | A1 * | 8/2005 | Nelson et al. | 370/260 |
| 2005/0210101 | A1 * | 9/2005 | Janik | 709/203 |
| 2006/0064720 | A1 * | 3/2006 | Istvan et al. | 725/38 |
| 2006/0071825 | A1 * | 4/2006 | Demos | 341/50 |
| 2006/0117371 | A1 * | 6/2006 | Margulis | 725/131 |
| 2006/0209794 | A1 * | 9/2006 | Bae et al. | 370/352 |
| 2007/0041330 | A1 * | 2/2007 | Bostica et al. | 370/252 |
| 2007/0124769 | A1 * | 5/2007 | Casey et al. | 725/46 |

(Continued)

*Primary Examiner* — Henry Tsai
*Assistant Examiner* — Christopher Bartels
(74) *Attorney, Agent, or Firm* — Garlick & Markison; Bruce E. Stuckman

(57) ABSTRACT

A media source device includes media files in either original source format or in alternative digital formats, based on a content descriptor indicated by a client device from a plurality of content descriptors generated to represent possible transcodings of the source format. In the alternative, a media source device can receive a client device report and subsequent request for a media file. The media source device can send the media file to the client device in a particular digital format based on whether the content descriptor corresponding to the media file is compatible or incompatible with the client device. The bit rate used to send the media file to the client device can be adjusted based on the available transmit bit rate.

15 Claims, 8 Drawing Sheets

(56) References Cited

U.S. PATENT DOCUMENTS

| | | | |
|---|---|---|---|
| 2007/0172041 A1* | 7/2007 | Boccon-Gibod et al. | 379/142.1 |
| 2007/0244929 A1* | 10/2007 | Huang et al. | 707/104.1 |
| 2008/0109549 A1* | 5/2008 | Nakagawa et al. | 709/225 |
| 2008/0109852 A1* | 5/2008 | Kretz et al. | 725/62 |
| 2008/0201416 A1* | 8/2008 | Lipton | 709/203 |
| 2009/0100147 A1* | 4/2009 | Igarashi | 709/218 |

* cited by examiner

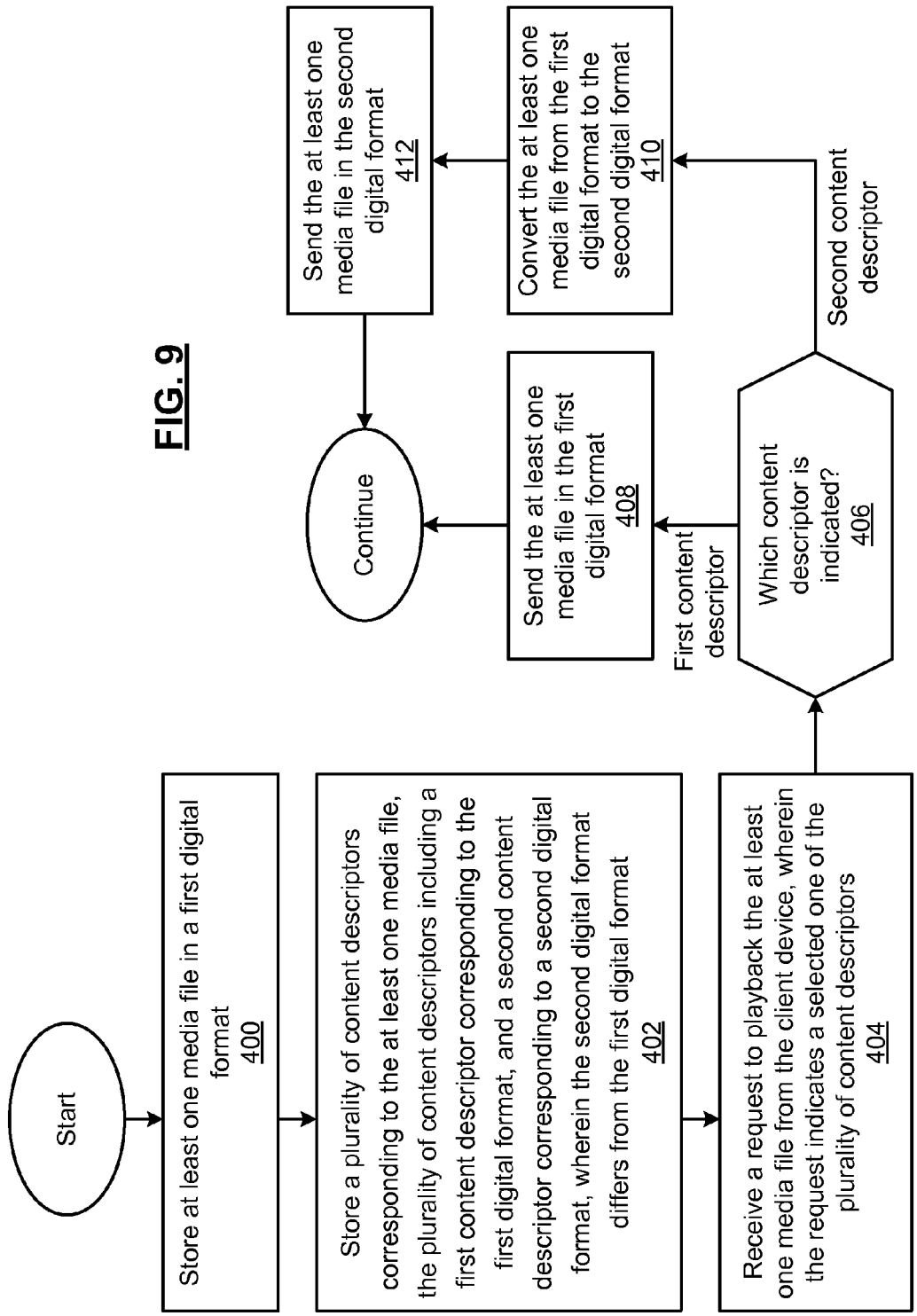

MEDIA SOURCE DEVICE WITH DIGITAL FORMAT CONVERSION AND METHODS FOR USE THEREWITH

CROSS REFERENCE TO RELATED PATENTS

Not applicable

TECHNICAL FIELD OF THE INVENTION

The present invention relates to security in processing devices.

DESCRIPTION OF RELATED ART

Specifications have been promulgated by the Digital Living Network Alliance (DLNA) and the Universal Plug and Play Forum UPnP that define guidelines for the interaction of audio/video (AV) devices to share multimedia content. Due to the wide ranging and complex nature of possible AV content formats, however, there may be the need to change the AV content format so that the playback devices are able to play the content from the AV source devices. For example, to watch a high definition (HD) video on a standard definition (SD) DLNA mobile client device, the format must be changed to low resolution format to meet the DLNA client playback capabilities before it is streamed to the client device.

According to the DLNA and UPnP specification, all content stored in a source device is exposed to the client devices by a Content Directory Service (CDS). The CDS is a summary of the content's properties described in extensible markup language (XML). The content properties include the information that describes what the content is and how the content is stored and where it is stored, such as the content title, the content format, the resolution, the duration, the owner information, the link to the content, etc. In order to playback the content, a client device must get the CDS from the source device to display the content list in the display. When the certain content is selected, the client device sends the selected content link back to the source device to start the content playback process. In many cases, the playback may fail if the format of the original content is not compatible with the format of the client device.

Further limitations and disadvantages of conventional and traditional approaches will become apparent to one of ordinary skill in the art through comparison of such systems with the present invention.

BRIEF DESCRIPTION OF THE SEVERAL VIEWS OF THE DRAWINGS

FIG. 9 presents a flowchart representation of a method in accordance with an embodiment of the present invention.

DETAILED DESCRIPTION OF THE INVENTION INCLUDING THE PRESENTLY PREFERRED EMBODIMENTS

Figure 1:
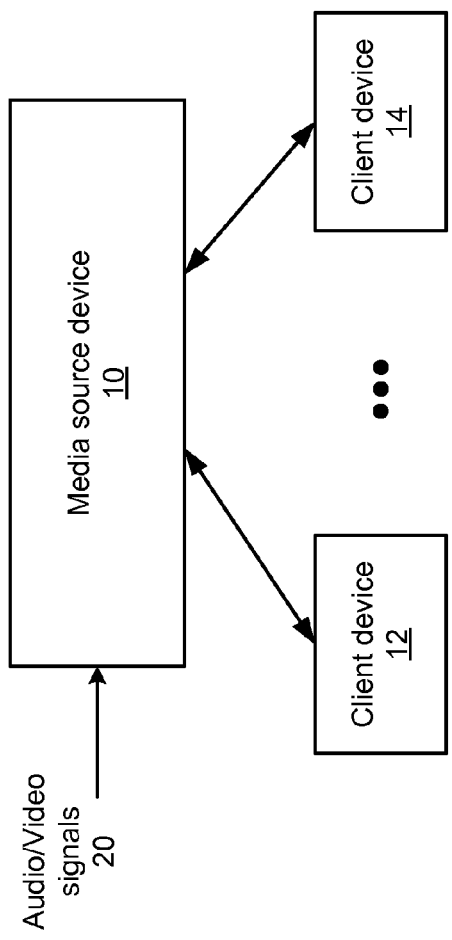
FIG. 1 presents a block diagram representation of a multimedia system in accordance with an embodiment of the present invention.

FIG. 1 presents a block diagram representation of a multimedia system in accordance with an embodiment of the present invention. In particular, a media source device 10 is presented that can provide media content to one or more client devices 12, 14 that are communicatively coupled thereto. Media source 10 can be a computer, set-top box, digital video recorder, server, personal media player, disk player, game station, or other source of audio video and/or other media content.

In operation, media source 10 stores one or more media files obtained, for instance, via audio/video signals 20. Audio/video signals 20 can be generated by or received from, a set-top box, television receiver, personal computer, cable television receiver, satellite broadcast receiver, broadband modem, 3G transceiver, a broadcast satellite system, internet protocol (IP) TV system, the Internet, a digital video disc player, compact disc player, a digital video recorder, or other video device. Accordingly, the audio/video signals 20 can include a broadcast audio or video signal, such as a digital radio signal, television signal, high definition television signal, enhanced high definition television signal or other broadcast signal that has been transmitted over a wireless medium, either directly or through one or more satellites or other relay stations or through a cable network, optical network or other transmission network. In addition, the audio/video signals 20 can be generated from a stored audio or video file, played back from a recording medium such as a magnetic tape, magnetic disk or optical disk, and can include a streaming audio or video signal that is transmitted over a public or private network such as a local area network, wide area network, metropolitan area network or the Internet.

The client devices 12 and 14 can be mobile media players, televisions, video projectors or other display devices, handheld gaming devices, audio systems, home theater systems, audio players, or other client devices. In an embodiment of the present invention, the client devices 12, 14 can be communicatively coupled to the media source device 10 via a wireless connection such as a wireless local area network (WLAN), a piconet such as a Bluetooth connection, infrared connection, or other wireless data connection, or a wired connection such as an Ethernet connection, a memory card connection, USB connection, Firewire (IEEE 1394) connection, SCSI connection, PCMCIA connection, HDMI connection, or other wired connection or port, either standard or proprietary.

Media source device 10 and clients devices 12, 14 operate in accordance with the present invention to, when necessary, convert the digital format of media content from the media source device 10 to a digital format compatible for playback on the client devices 12, 13. Further details regarding the implementation and operation of media source device 10 including several optional functions and features will be described in conjunction with FIGS. 2-12 that follow.

Figure 2:
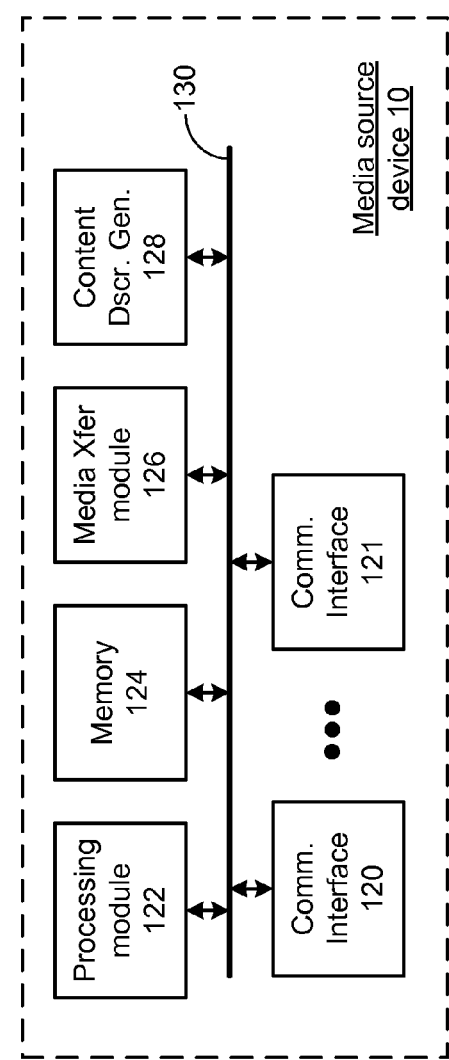
FIG. 2 presents a block diagram representation of a media source device 10 in accordance with an embodiment of the present invention.

FIG. 2 presents a block diagram representation of a media source device 10 in accordance with an embodiment of the present invention. In particular, a media source device 10 is shown that can operate in accordance with the DLNA and UPnP specifications, however other configurations are likewise possible. Media source 10 includes a plurality of communication interfaces 120, 121 for communicating on a wired or wireless basis with one or more client devices such as client devices 12, 14. These communication interfaces can include wireless transceivers that operate via a WLAN, Bluetooth connection, infrared connection, wireless telephony receiver or other wireless data connection, and/or a wired modem, port or other network adaptors that communicate with client devices via a cable, connector, local area network (LAN), the Internet, cable network, telephone network or other network or device.

Media source device 10 further includes a processing module 122 and memory 124 for executing one or more applications pertaining to the general functions and features of the media source device 10 as well as optionally providing shared processing and memory resources for operation of the other modules of media source device 10. Processing module 122 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 124.

Memory module 124 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture with bus 130 is shown, alternative architectures using direct connectivity between one or more modules and/or additional buses can likewise be implemented in accordance with the present invention.

In operation, memory 124 stores media files for playback by the client devices 12, 14. A particular media file is stored in digital format. A content descriptor such as a descriptor in accordance with CDS is stored in memory 124 and associated with the media file. The content descriptor can include data fields that summarize the properties of the media file, such as content title, format, resolution, bit rate, duration, owner information, as well as a link to the content. In an embodiment of the present invention, an original content descriptor is stored in memory that corresponds to the properties of the media file, as it is stored.

In addition to the original content descriptor, one or more additional content descriptors are generated by content description generator 128 that link to the original media file, but contain other possible formats, resolutions, bit rates, etc., that can be created if necessary to conform with the properties of a particular client device. Content descriptor generator 128 operates by reading the original content descriptor and generating one or more additional content descriptors based on a list of possible transcodings of the digital format of the original media file to other formats. These transcodings can include conversion of the original digital video format to another digital video format, conversion of the original digital audio format to another digital audio format, conversion of the original bit rate to another bit rate, conversion of the original video resolution to a different resolution, etc. As used herein, the format of a media file corresponds to the particular properties that define the storage and/or transfer of the media file including, for instance, audio format, video format, resolution, bit rate, etc.

When a client device 12, 14 is communicatively coupled to the media source device 10, the media source device 10 can send, via the corresponding communication interface 120, 121 the content descriptors to the client device 12, 14 for selection. Multiple content descriptors can be sent for each media file stored in media source device 10 corresponding to the original format of the media file (as it is stored) and other formats that are possible through conversion. In response, the client device 12, 14, either automatically or based on user input, can select a content descriptor and transmit a request back to the media source device 10 to playback a particular media file, wherein the request indicates the content descriptor that was selected.

The request is provided to a media transfer module 126, such as a media player, file transfer utility or other device for sending the selected media file to the client device 12 or 14 that requested it, via the corresponding communication interface 120, 121. If the request indicates the original content descriptor was selected corresponding to the original properties of the media file (as it is stored), the media transfer module sends the media file in its original format, resolution, etc. If however, the request indicates one of the additional second content descriptors for that media file, the media transfer module 126 operates to convert the format of the media file from the original digital format to the digital format of the content descriptor that was selected. The media transfer module 126 sends the media file to the client device 12 or 14 that requested it, in the converted digital format.

Figure 3:
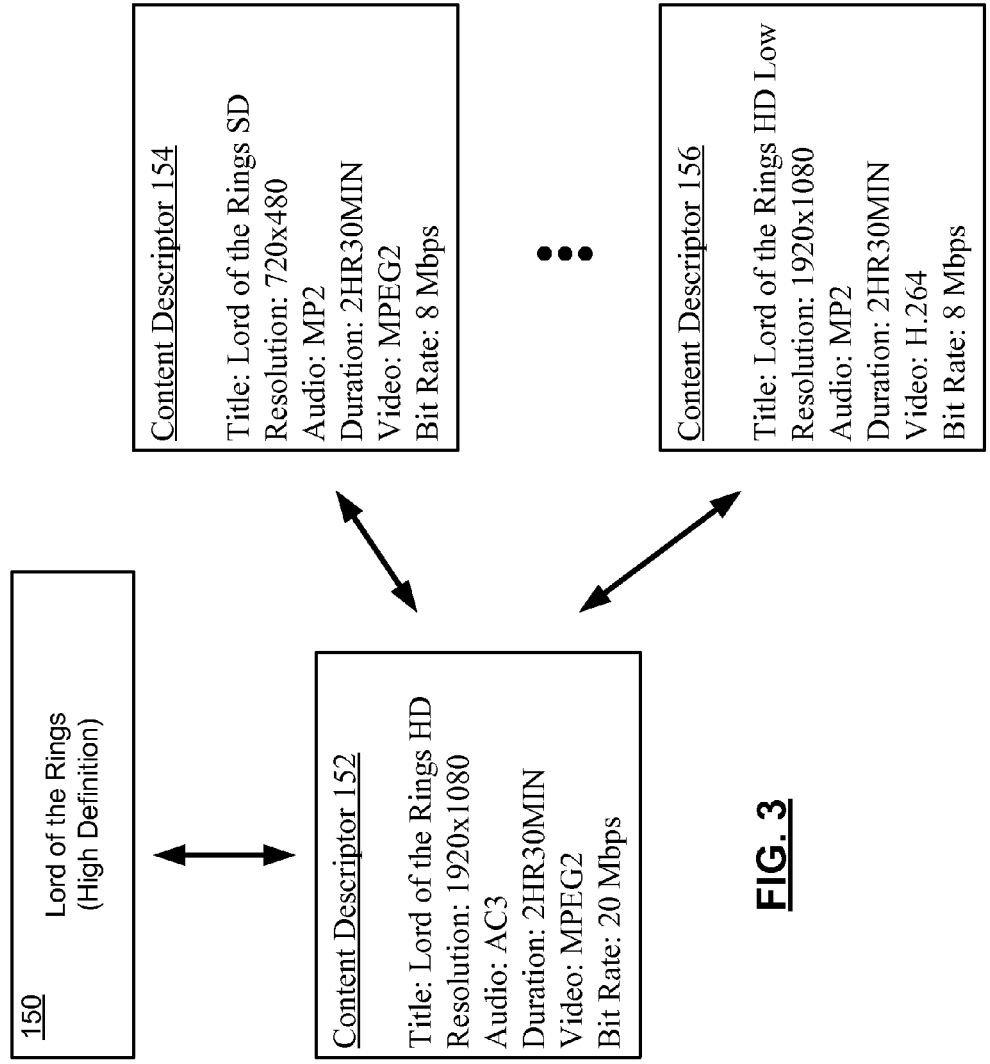
FIG. 3 presents a block diagram representation of a media file and a plurality of corresponding content descriptors in accordance with an embodiment of the present invention.

FIG. 3 presents a block diagram representation of a media file and a plurality of corresponding content descriptors in accordance with an embodiment of the present invention. In this example, the media file 150 is a digital media file that stores a high definition (HD) version of of a motion picture such as, Lord of the Rings. Content descriptor 152 corresponds to the original format of the media file as it is stored and can be delivered. Content descriptors 154 and 156 are generated by content descriptor generator 128 based on possible transcodings of the original media file. Content descriptor 154 represents a transcoding of the original media file to an 8 Mbps stream with a resolution reduced from 1920×1080 to 720×480, and the audio format changed from AC3 to MP2. Content descriptor 156 represents a transcoding of the original media file to an 8 Mbps stream with the video format changed from MPEG2 to H.264, and the audio format changed from AC3 to MP2.

The content descriptors each contain a link to the original source material such as a universal resource indicator (URI) that is not specifically shown, a title, resolution, audio format, duration, video format and bit rate and may further contain additional information. While shown in a plain text format, each content descriptor can be coded in XML, other mark-up languages or in other formats, depending on the particular standards employed and/or the particular implementations.

As should be understood, content descriptors 154 and 156 represent possible transcodings of the particular media file shown to an alternative format. In an embodiment of the present invention, content descriptors can be created that correspond to all possible transcoding, to a fixed or limited number of possible transcodings, to one or more popular destination formats, to one or more destination formats previously applied to a particular client device 12 or 14, etc. The example above is intended to be illustrative of a limited example of the broad range of possible implementations.

Figure 4:
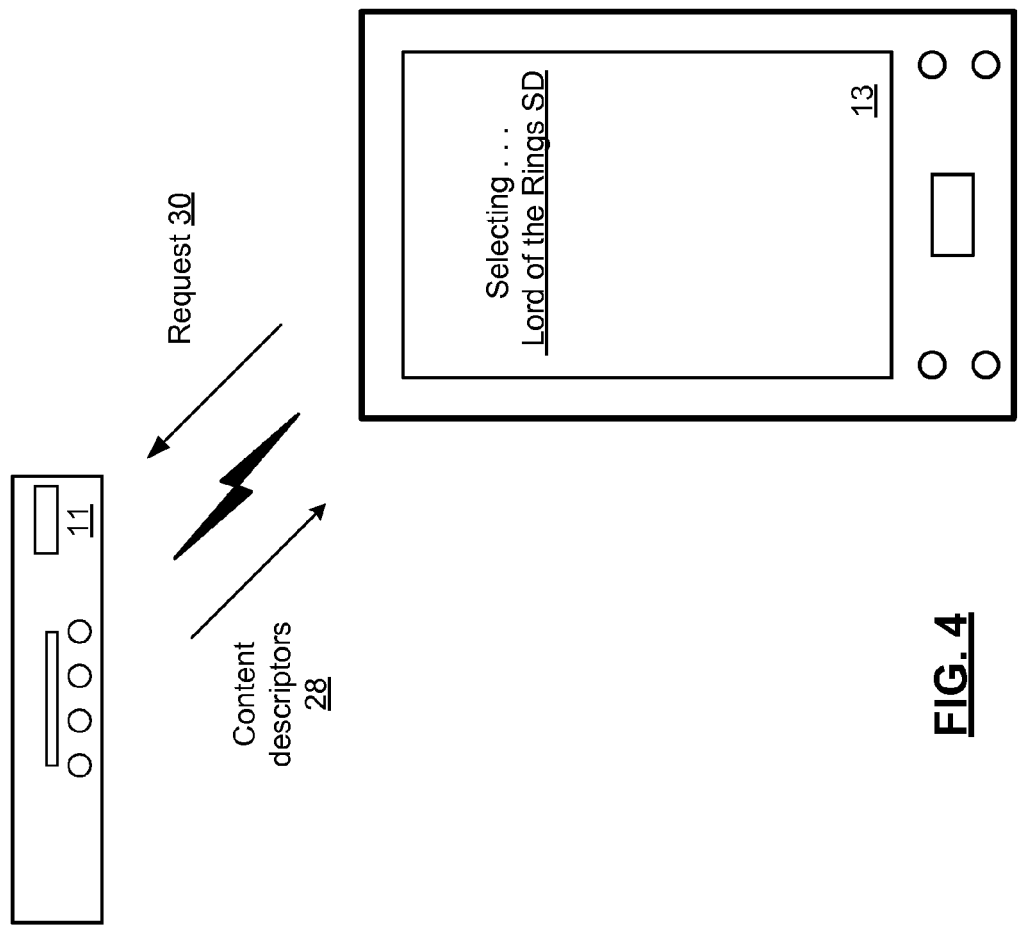
FIG. 4 presents a pictorial representation of the interaction between a media source device 11 and a client device 13 in accordance with an embodiment of the present invention.

FIG. 4 presents a pictorial representation of the interaction between a media source device 11 and a client device 13 in accordance with an embodiment of the present invention. In particular, this representation continues on with the example introduced in conjunction with FIG. 3 and presents a media source device 10 in the form of digital video recorder (DVR) 11 and a client device 12 or 14 in the form of mobile video device 13. DVR 11 communicates with mobile video device 13 via a wireless local area network, such as a 802.11 communication link. In operation, content descriptors 28, such as content descriptors 152, 154 and 156 along with other content descriptors corresponding to Lord of the Rings and to other media files stored in the DVR 11, are sent to the mobile video device 13.

In this case, the mobile video device 13 display a directory listing of the media files and formats based on the content descriptors 28. Each of the content descriptors 28 can be treated like separate content at the video device 13. Alternatively, the video device 13 can filter the content descriptors 28 and only display selected ones that are compatible with the video device 13. In this example, the user selects Lord of the Rings SD for playback corresponding to content descriptor 154. The mobile video device 13 generates a request that indicates this particular content descriptor and sends this request to DVR 11. Since this format is different from the format that this content is stored, the DVR 11 transcodes the media file 150 to the SD format requested by mobile device 13 and delivers the media file to the mobile device 13 in this format.

Figure 5:
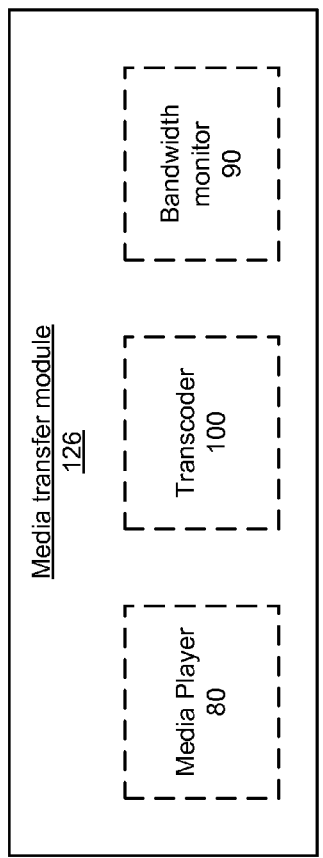
FIG. 5 presents a block diagram representation of a media transfer module 126 in accordance with an embodiment of the present invention.

FIG. 5 presents a block diagram representation of a media transfer module 126 in accordance with an embodiment of the present invention. As shown, the media transfer module 126 includes a media player 80 that responds to playback commands and accesses stored media files to create a data stream from a stored media file based on playback requests from one or more client devices. Transcoder 100 operates to optionally alter the bit rate, audio format, data format, resolution, frame rate, or other formatting of the data stream to conform to the formatting of one or more client devices 12, 14. Transcoder 100 can operate based on input from an optional bandwidth monitor 90 to adjust the bit rate of the transmitted data stream to conform with current transmission conditions.

In an embodiment of the present invention, bandwidth monitor 90 monitors an available transmit bit rate of one or more of the communication interfaces 120, 121. In operation, bandwidth monitor can operate based on performance feedback from one or more client devices 12, 14 corresponding to each communication interface, based on a bit error rate, packet error rate, known channel limitations, historical transmission averages, etc. derived from acknowledgements received from one or more client devices 12, 14 or based on other channel performance characteristics to determine an available transmit bit rate. Transcoder 100 can operate as a bit rate adjustor, to adjust the transmit bit rate used to send the media file to the client device on the corresponding channel, based on the available transmit bit rate. For instance, when sending the media file in the original format, the transcoder 100 can transrate the data stream generated from a media file to lower the transmit bit rate to the available transmit bit rate when the available transmit bit rate is greater than a bit rate corresponding to the original format. In addition, when sending the media file in a transcoded format, the transcoder 100 can also transrate the data stream generated from a media file to lower the transmit bit rate to the available transmit bit rate when the available transmit bit rate is greater than a bit rate corresponding to the original format.

Considering the examples presented in conjunction with FIG. 3, if a client device 12, 14 requests playback of Lord of the Rings at the original 20 Mbps rate, but the corresponding communication interface 120, 121 only has an available transmit bit rate of 11 Mbps, then the transcoder 100 can transrate the media file into a 11 Mbps bit rate based on further compression, reduced color scale, resolution, etc. Similarly, if a client device 12, 14 requests playback of Lord of the Rings SD at the 8 Mbps rate, but the corresponding communication interface 120, 121 only has an available transmit bit rate of 6 Mbps, then the transcoder 100 can transrate the media file into a 6 Mbps bit rate. In an embodiment of the present invention, the bandwidth monitor 90 can determine an available transmit rate in real time or near-real time based to, for instance, reflect the current conditions of a wireless communication channel. In this fashion, the transcoder 100 can adjust the transmit bit rate to adapt to current channel conditions.

Media player 80 and bandwidth monitor 90 can be implemented via dedicated hardware or via software or firmware running on a processor, such as processing module 122 or other processing device.

Figure 6:
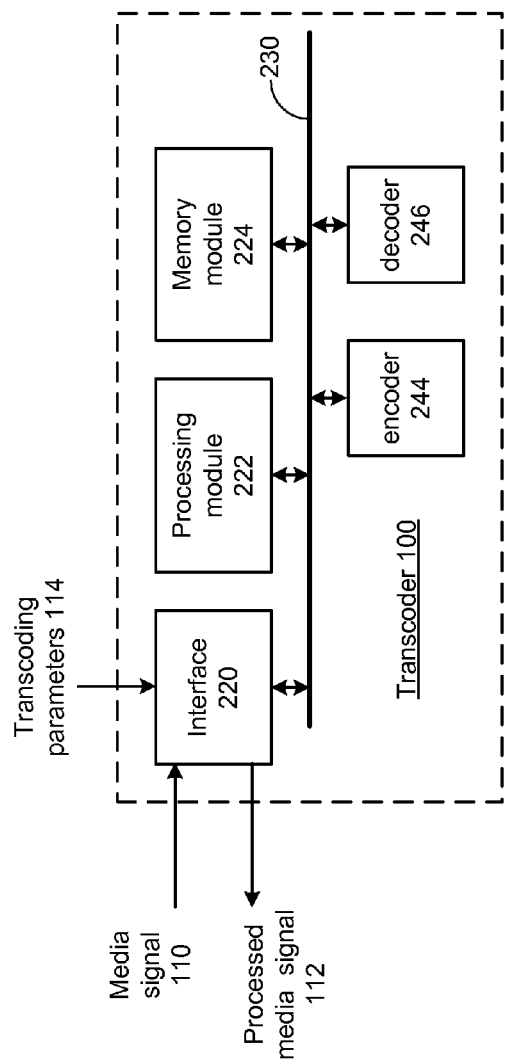
FIG. 6 presents a block diagram representation of a transcoder 100 in accordance with an embodiment of the present invention.

FIG. 6 presents a block diagram representation of a transcoder 100 in accordance with an embodiment of the present invention. In particular, an embodiment of transcoder 100 is shown that includes interface 220, processing module 222, memory module 224, encoder 244 and decoder 246. As discussed in conjunction with FIG. 5, transcoder 100 operates to optionally alter the bit rate, audio format, data format, resolution, frame rate, or other formatting of the data stream to conform to the formatting of one or more client devices 12, 14 and/or to adjust the bit rate of a transmitted data stream to conform with current transmission conditions. In operation, transcoder 100 receives transcoding parameters 114 such as the source format of a media source signal 110 and a desired transcoded format of processed media signal. These transcoding parameters 114 can include source and transcoded resolution, bit rate, audio format and video format along with other formatting to implement the transcoding of the present invention. The media signal 110 can be decoded into an intermediate format via decoder 246 and then re-encoded by encoder 244 to produce processed media signal 112. Alternatively, decoder 246 and encoder 244 can cooperate to re-encode partially decoded data, re-use portions of the originally encoded data and information in the media signal 110 when producing the processed media signal 112

Transcoder 100 includes an interface 220 for receiving a media signal 110 and for transferring a processed media signal 112 to a device, such as one or more communication interfaces 120, 121. Media signal 110 and processed media signal 112 can each be digital video signals in any of a number of video formats with or without an associated audio component such as Moving Picture Experts Group-1 (MPEG1) audio layer 2 or 3, (MP2 or MP3), Active Coding 2 or 3 (AC2 or AC3), etc. Such digital video formats can include formats such as H.264, VC-1 (SMPTE standard 421M), MPEG-4 Part 10 Advanced Video Coding (AVC) or other digital format such as a format MPEG1, MPEG2 or MPEG4), Quicktime format, Real Media format, Windows Media Video (WMV), Audio Video Interleave (AVI), high definition media interface (HDMI) or another digital video format, either standard or customized.

In an embodiment of the present invention, the transcoder 100 is implemented via an XCode processor produced by VIXS Systems, Inc. However, other implementations are likewise possible that employ other processors and/or other devices. In particular, processing module 222 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 224. Memory module 224 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Encoder 244 and decoder 246 can be implemented via dedicated hardware engines, or via shared processing resources. While a particular bus architecture with bus 230 is shown, alternative architectures using direct connectivity between one or more modules and/or additional buses can likewise be implemented in accordance with the present invention.

Figure 7:
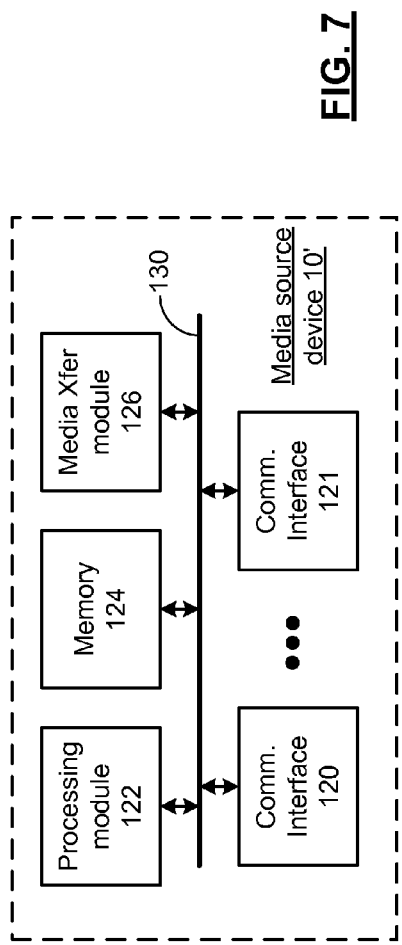
FIG. 7 presents a block diagram representation of a media source device 10' in accordance with another embodiment of the present invention.

FIG. 7 presents a block diagram representation of a media source device 10' in accordance with another embodiment of the present invention. In particular, media source device 10' includes many common elements of media source device 10 that are referred to by common reference numerals and that operate in a similar fashion. In this embodiment however, instead of creating multiple content descriptors from a single media file via a content description generator, a client device 12, 14 sends a client device report to the media source device, prior to submitting a request to playback a particular media file.

The operation, media source device 10' receives client device reports from client devices. This client device report can be received in conjunction with a client device 12, 14 that docks, plugs in, logs-in, registers, pairs or otherwise that associates with the media source device 10' via one or more of the communication interfaces 120, 121. The client device report contains the playback capability of the client device 12, 14 for use by the media source device 10' to determine the format to be used to send media content to the client device, before any playback action invoked. In particular, media transfer module 126 analyzes the client device report and identifies a format for the kind of stream that is suitable for the client device 12, 14 to play. This format is stored in a table in association with the client device 12 or 14 that sent the client device report.

Media source device 10' then shares a single content descriptor for each of the media files available for playback with the client device 12 or 14. This can contain content descriptors for media files that are stored in a compatible format to the format of the client device 12 or 14. In addition, content descriptors can also be provided for media files in an incompatible format, that can be converted to a compatible format for client device 12 or 14. In an embodiment of the present invention, the media transfer module 126 contains a transcoder, such as transcoder 100 and further maintains a list of possible transcodings of digital formats. In this embodiment, media transfer module 126 does not send to a client device 12 or 14, content descriptors for media files that are stored in an format that is incompatible with the particular client device and that cannot be transcoded into a format compatible with the particular client device.

When the media source device 10' receives a playback command that contains a selected content link from this particular client device 12 or 14, the media transfer module 126 retrieves the format for that device and compares it to the format of the media file that was selected. If the formats match, the media transfer module 126 sends the media file in the original format. If the formats do not match, the media transfer module converts the content format according to the capability of the client device and sends the media file to the client device in the converted format.

As discussed in conjunction with FIG. 5, media transfer module 126 can operate based on input from an optional bandwidth monitor 90 to adjust the bit rate of the transmitted data stream to conform with current transmission conditions. In particular, bandwidth monitor 90 can monitor the available transmit bit rate of one or more of the communication interfaces 120, 121. In operation, bandwidth monitor 90 can operate based on performance feedback from one or more client devices 12, 14 corresponding to each communication interface, based on a bit error rate, packet error rate, known channel limitations, historical transmission averages, etc. derived from acknowledgements received from one or more client devices 12, 14 or based on other channel performance characteristics to determine an available transmit bit rate. Media transfer module 126 can include a transcoder 100 that operates as a bit rate adjustor, to adjust the transmit bit rate used to send the media file to the client device on the corresponding channel, based on the available transmit bit rate.

For instance, when sending the media file in the original format, the transcoder 100 can transrate the data stream generated from a media file to lower the transmit bit rate to the available transmit bit rate when the available transmit bit rate is greater than a bit rate corresponding to the original format. In addition, when sending the media file in a transcoded format, the transcoder 100 can also transrate the data stream generated from a media file to lower the transmit bit rate to the available transmit bit rate when the available transmit bit rate is greater than a bit rate corresponding to the original format.

Figure 8:
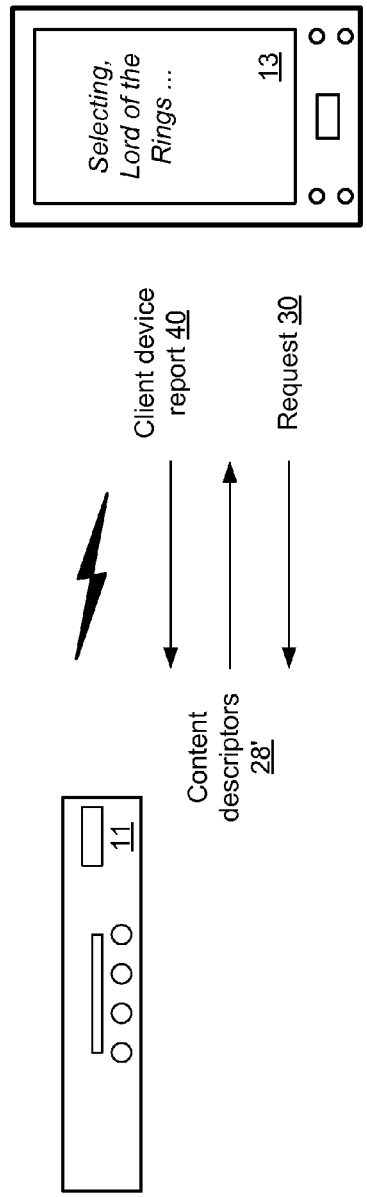
FIG. 8 presents a pictorial representation of the interaction between a media source device 11 and a client device 13 in accordance with another embodiment of the present invention.

FIG. 8 presents a pictorial representation of the interaction between a media source device 11 and a client device 13 in accordance with another embodiment of the present invention. In particular, this representation continues on with the example introduced in conjunction with FIG. 3 and presents a media source device 10 in the form of digital video recorder (DVR) 11 and a client device 12 or 14 in the form of mobile video device 13. DVR 11 communicates with mobile video device 13 via a wireless local area network, such as a 802.11 communication link. In operation, mobile video device 13 shares a client device report 40 with DVR 11 that identifies that mobile video device 13 is a SD device that has a display resolution of 720×480 and that can operate with MPEG2 video and MP2 audio formats with a 8 Mbps bit rate. This information is stored in a list associated with mobile device 13.

DVR 11 provides content descriptors 28' for media files that are available for viewing including media files in the compatible SD format and media files that can be converted into the compatible SD format based on available transcodings of each of the original formats. These content descriptors 28' include content descriptor 152 that is selected by the mobile video device 13 under user control. The mobile video device 13 generates a request 30 that indicates this particular content descriptor 152, corresponding to media file 150 (Lord of the Rings) and sends this request to DVR 11. The media transfer module 126 of DVR 11 recognizes the request as originating from mobile video device 13 and looks up the capabilities of this device from its list. Since the original digital format of the selected media file 150 is incompatible with the format associated with the mobile video device 13, DVR 11 transcodes the media file 150 to the SD format of mobile device 13 and delivers the media file 150 to the mobile device 13 in this format.

FIG. 9 presents a flowchart representation of a method in accordance with an embodiment of the present invention. In particular a method is presented for use in conjunction with one or more functions and features described in conjunction with FIGS. 1-8. In step 400, at least one media file is stored in a first digital format. In step 402, a plurality of content descriptors corresponding to the at least one media file are stored, the plurality of content descriptors including: a first content descriptor corresponding to the first digital format; and a second content descriptor corresponding to a second digital format, wherein the second digital format differs from the first digital format. In step 404, a request to playback the at least one media file is received from the client device, wherein the request indicates a selected one of the plurality of content descriptors. In decision block 406, the method determines which content descriptor was indicated in the request. In step 408, the at least one media file is sent in the first digital format, when the request indicates the first content descriptor. When the request indicates the second content descriptor, in step 410, the at least one media file is converted from the first digital format to the second digital format, and in step 412, the at least one media file is sent in the second digital format.

Figure 10:
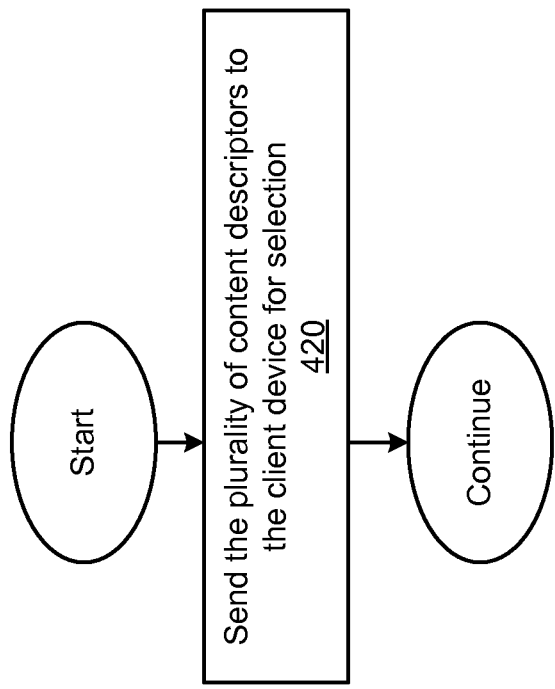
FIG. 10 presents a flowchart representation of a method in accordance with an embodiment of the present invention.

FIG. 10 presents a flowchart representation of a method in accordance with an embodiment of the present invention. In particular a method is presented for use in conjunction with one or more functions and features described in conjunction with FIGS. 1-8. In step 420, the plurality of content descriptors are sent to the client device for selection.

Figure 11:
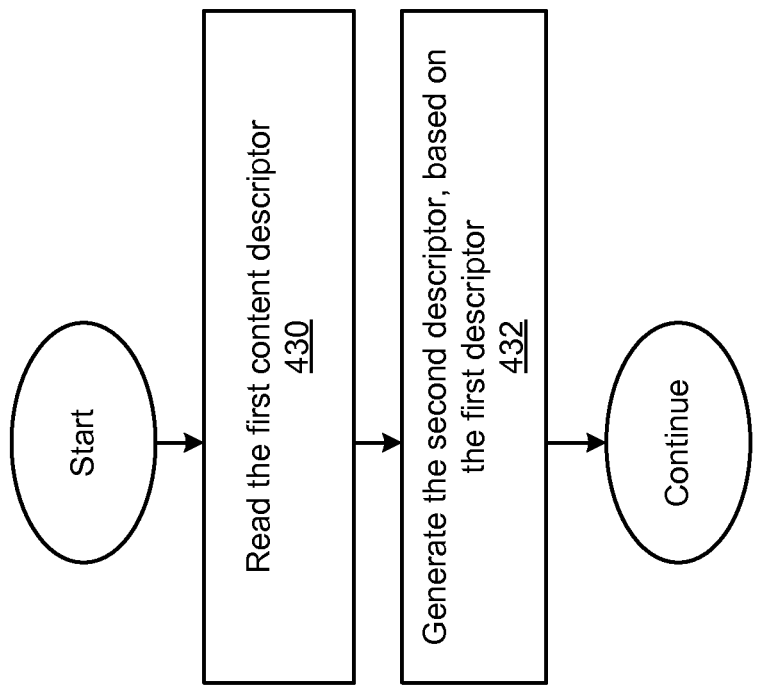
FIG. 11 presents a flowchart representation of a method in accordance with an embodiment of the present invention.

FIG. 11 presents a flowchart representation of a method in accordance with an embodiment of the present invention In particular a method is presented for use in conjunction with one or more functions and features described in conjunction with FIGS. 1-10. In step 430, the first content descriptor is read. In step 432, the second content descriptor is generated, based on the first descriptor.

Figure 12:
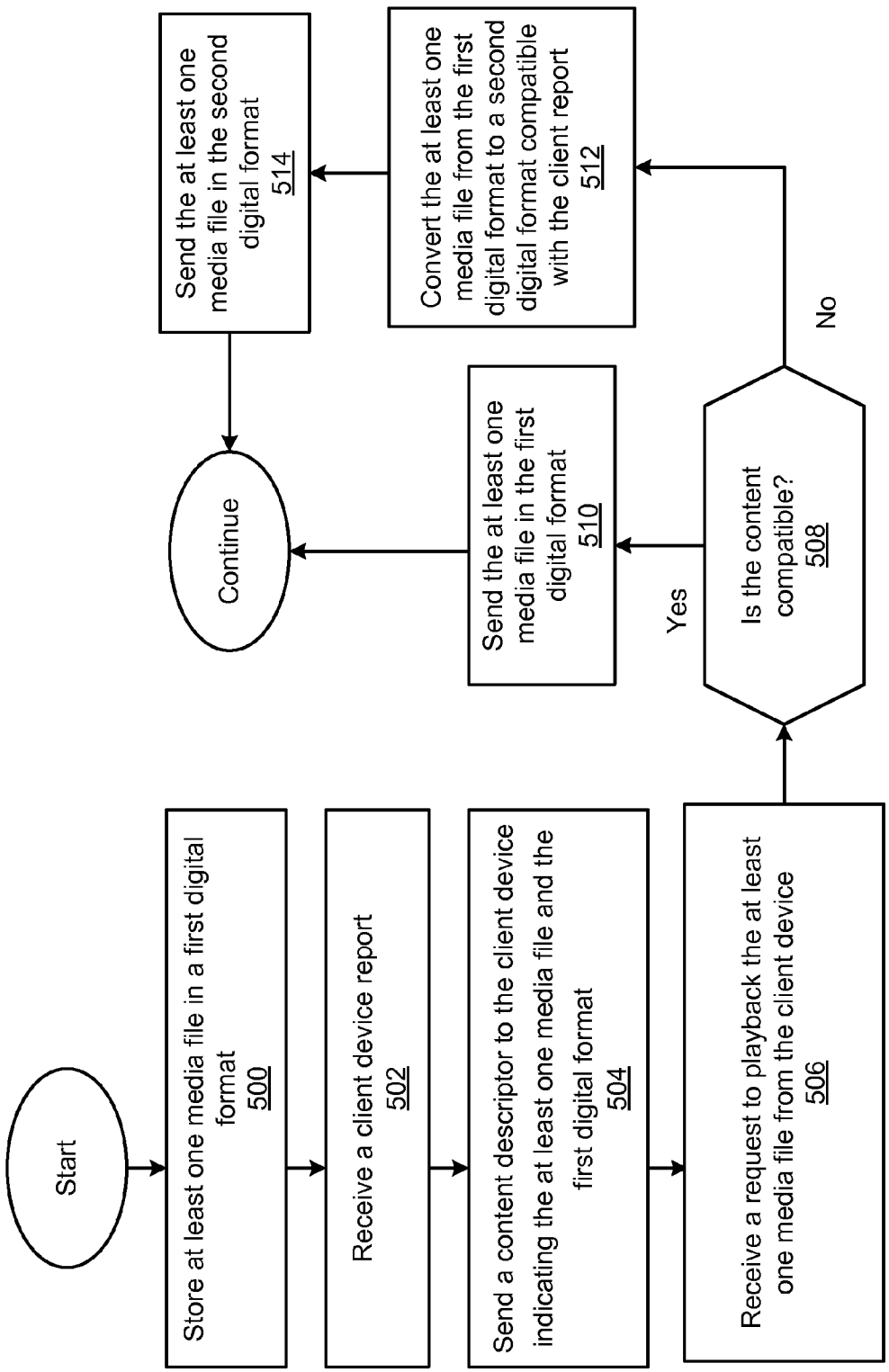
FIG. 12 presents a flowchart representation of a method in accordance with an embodiment of the present invention.

FIG. 12 presents a flowchart representation of a method in accordance with an embodiment of the present invention In particular a method is presented for use in conjunction with one or more functions and features described in conjunction with FIGS. 1-11. In step 500, at least one media file is stored in a first digital format. In step 502, a client device report is received. In step 504, a content descriptor is sent to the client device indicating the at least one media file and the first digital format. In step 506, a request to playback the at least one media file is received from the client device. In decision block 508, the method determines if the client device is compatible with the first digital format. In step 510, the at least one media file is sent in the first digital format, when the client device report indicates that the client device is compatible with the first digital format. When the client device report indicates that the client device is incompatible with the first digital format, the at least one media file is converted from the first digital format to a second digital format compatible with the client device report in step 512, and in step 514, the at least one media file is sent to the client device in the second digital format.

While particular combinations of various functions and features of the present invention have been expressly described herein, other combinations of these features and functions are possible that are not limited by the particular examples disclosed herein are expressly incorporated within the scope of the present invention.

As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled".

As the term module is used in the description of the various embodiments of the present invention, a module includes a functional block that is implemented in hardware, software, and/or firmware that performs one or more functions such as the processing of an input signal to produce an output signal. As used herein, a module may contain submodules that themselves are modules.

Thus, there has been described herein an apparatus and method, as well as several embodiments including a preferred embodiment, for implementing a processing system and video processing system along with an application security routine for use therewith and with other processing systems. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A media source device comprising:
   a memory for storing at least one media file in a first digital compression format and for storing a plurality of content descriptors corresponding to the at least one media file, the plurality of content descriptors including:
   a first content descriptor including a first universal resource indicator corresponding to the first digital compression format; and
   a second content descriptor corresponding to a possible transcoding of the at least one media file into a second digital compression format, wherein the second digital compression format differs from the first digital compression format, and wherein the first content descriptor and the second content descriptor each specify at least one of: a video compression format, an audio compression format, a video resolution, and a streaming bit rate, wherein the second content descriptor includes a second universal resource indicator providing a link to the at least one media file in the second digital compression format that is not yet stored;
a communication interface for communicating with a client device, that sends the plurality of content descriptors to the client device and receives a request to playback the at least one media file from the client device, wherein the request indicates a selected one of the plurality of content descriptors; and
a media transfer module, coupled to the memory and the communication interface, that sends the at least one media file to the client device via the communication interface by:
sending the at least one media file in the first digital compression format, when the request indicates the first content descriptor; and
when the request indicates the second content descriptor and includes the link to the at least one media file in the second digital compression format that is not yet stored, converting the at least one media file from the first digital compression format to the second digital compression format, and sending the at least one media file in the second digital compression format;
wherein the media transfer module includes:
a bandwidth monitor that determines an available transmit bit rate of the communication interface based on feedback from the client device that indicates current channel conditions, wherein the feedback is generated in response to sending at least a portion of the at least one media file to the client device; and
a transcoder, for adjusting a transmit bit rate during the sending of the at least one media file, wherein the adjusting is in accordance with the current channel conditions and based on the available transmit bit rate determined by the bandwidth monitor.

2. The media source device of claim 1 wherein the transcoder transcodes the at least one media file from the first digital compression format to the second digital compression format.

3. The media source device of claim 1 wherein the communication interface sends the plurality of content descriptors to the client device for selection.

4. The media source device of claim 1 further comprising:
a content descriptor generator, coupled to the memory, that reads the first content descriptor and that generates the second content descriptor, based on the first descriptor.

5. The media source device of claim 4 wherein the content descriptor generator generates the second content descriptor based on the first digital compression format and based further on a list of possible transcodings of the first digital compression format.

6. The media source device of claim 1, wherein the transcoder transrates the at least one media file to lower the bit rate to the available transmit bit rate when the available transmit bit rate is greater than a bit rate corresponding to the first digital compression format and when sending the at least one media file in the first digital compression format; and
wherein the transcoder transrates the at least one media file to lower the bit rate to the available transmit bit rate when the available transmit bit rate is greater than a bit rate corresponding to the second digital compression format and when sending the at least one media file in the second digital compression format.

7. The media source device of claim 1 wherein the media source device is a digital living network alliance device with universal plug and play.

8. A media source device comprising:
a memory for storing a plurality of media files;
a communication interface for communicating with a client device, that receives a client device report indicating a compatible format, that sends content descriptors to the client device, and that receives a request to playback a selected one of the plurality of media files from the client device;
a media transfer module, coupled to the memory and the communication interface, that determines the content descriptors based on the client device report by excluding from the plurality of media files ones of the plurality of media files that are stored in a format that is incompatible with the client device and further that cannot be transcoded into the compatible format, wherein the media transfer module sends the selected one of the plurality of media files to the client device via the communication interface by:
sending the selected one of the plurality of media files in a first digital compression format corresponding to a format the selected one of the plurality of media files is stored, when the client device report indicates that the client device is compatible with the first digital compression format; and
when the client device report indicates that the client device is incompatible with the first digital compression format, converting the selected one of the plurality of media files from the first digital compression format to a second digital compression format compatible with the client device, and sending the selected one of the plurality of media files in the second digital compression format;
wherein the media transfer module includes:
a bandwidth monitor that determines an available transmit bit rate of the communication interface based on feedback from the client device that reflects current channel conditions, wherein the feedback is generated in response to sending at least a portion of the selected one of the plurality of media files to the client device; and
a transcoder, for adjusting a transmit bit rate during the sending of the selected one of the plurality of media files, wherein the adjusting is in accordance with the current channel conditions and based on the available transmit bit rate determined by the bandwidth monitor.

9. The media source device of claim 8 wherein the transcoder transcodes the selected one of the plurality of media files from the first digital compression format to the second digital compression format.

10. The media source device of claim 8 wherein the communication interface receives the client device report before receiving the request to playback the selected one of the plurality of media files from the client device.

11. The media source device of claim 8, wherein the transcoder transrates the selected one of the plurality of media files to lower the transmit bit rate to the available transmit bit rate when the available transmit bit rate is greater than a bit rate corresponding to the first digital compression format and when sending the selected one of the plurality of media files in the first digital compression format; and
wherein the transcoder transrates the selected one of the plurality of media files to lower the transmit bit rate to the available transmit bit rate when the available transmit bit rate is greater than a bit rate corresponding to the second digital compression format and when sending the selected one of the plurality of media files in the second digital compression format.

12. A method comprising:

storing at least one media file in a first digital compression format;

storing a plurality of content descriptors corresponding to the at least one media file, the plurality of content descriptors including:

a first content descriptor including a first universal resource indicator corresponding to the first digital compression format; and a second content descriptor including a second universal resource indicator corresponding to a second digital compression format, wherein the second digital compression format differs from the first digital compression format, and wherein the first content descriptor and the second content descriptor each specify at least one of: a video compression format, an audio compression format, a video resolution, and a streaming bit rate, wherein the second content descriptor includes a second universal resource indicator providing a link to the at least one media file in the second digital compression format that is not yet stored;

sending the plurality of content descriptors to a client device via a communication interface;

receiving, via the communication interface, a request to playback the at least one media file from the client device, wherein the request indicates a selected one of the plurality of content descriptors and includes the link to the at least one media file in the second digital compression format that is not yet stored; and sending the at least one media file to the client device via the communication interface by:

sending the at least one media file in the first digital compression format, when the request indicates the first content descriptor; and when the request indicates the second content descriptor and includes the link to the at least one media file in the second digital compression format that is not yet stored, converting the at least one media file from the first digital compression format to the second digital compression format, and sending the at least one media file in the second digital compression format;

determining an available transmit bit rate of the communication interface based on feedback from the client device that reflects current channel conditions, wherein the feedback is generated in response to sending at least a portion of the at least one media file to the client device; and adjusting a transmit bit rate in accordance with the current channel conditions and based on the available transmit bit rate, wherein the adjusting is performed during the sending of the at least one media file.

13. The method of claim 12 further comprising:

sending the plurality of content descriptors to the client device for selection.

14. The method of claim 12 further comprising:

reading the first content descriptor; and generating the second content descriptor, based on the first descriptor.

15. A method comprising:

storing a plurality of media files;

receiving a client device report indicating a compatible format;

determining content descriptors based on the client device report by excluding from the plurality of media files, ones of the plurality of media files that are stored in a format that is incompatible with the client device and further that cannot be transcoded into the compatible format;

sending the content descriptors to the client device;

receiving a request to playback a selected one of the plurality of media files from the client device;

sending the selected one of the plurality of media files to the client device via a communication interface by:

sending the selected one of the plurality of media files in a first digital compression format corresponding to a format the selected one of the plurality of media files is stored, when the client device report indicates that the client device is compatible with the first digital compression format; and when the client device report indicates that the client device is incompatible with the first digital compression format, converting the selected one of the plurality of media files from the first digital compression format to a second digital compression format compatible with the client device, and sending the selected one of the plurality of media files in the second digital compression format;

determining an available transmit bit rate of the communication interface based on feedback from the client device that reflects current channel conditions, wherein the feedback is generated in response to sending at least a portion of selected one of the plurality of media files to the client device; and adjusting a transmit bit rate in accordance with the current channel conditions and based on the available transmit bit rate, wherein the adjusting is performed during the sending of selected one of the plurality of media files.

* * * * *